United States Patent
Alpert et al.

(10) Patent No.: US 12,219,450 B2
(45) Date of Patent: Feb. 4, 2025

(54) BLE CHANNEL AWARE OPERATION PARAMETERS

(71) Applicant: TEXAS INSTRUMENTS INCORPORATED, Dallas, TX (US)

(72) Inventors: Yaron Alpert, Hod Hasharon (IL); Maxim Altshul, Kadima (IL); Yaniv Weizman, Tel Aviv Jaffa (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 400 days.

(21) Appl. No.: 17/850,784

(22) Filed: Jun. 27, 2022

(65) Prior Publication Data
US 2023/0422010 A1 Dec. 28, 2023

(51) Int. Cl.
*H04W 4/80* (2018.01)
*H04W 76/15* (2018.01)

(52) U.S. Cl.
CPC .............. *H04W 4/80* (2018.02); *H04W 76/15* (2018.02)

(58) Field of Classification Search
CPC ....................................................... H04W 4/80
See application file for complete search history.

(56) References Cited

U.S. PATENT DOCUMENTS

| 11,696,212 B2* | 7/2023 | Heil ...................... H04W 4/80 370/328 |
| 2015/0263833 A1* | 9/2015 | Li ......................... H04L 5/0035 370/449 |
| 2015/0365999 A1* | 12/2015 | Lee ....................... H04W 4/80 381/315 |
| 2016/0021526 A1* | 1/2016 | Niu ....................... H04L 47/12 370/230 |
| 2017/0223615 A1* | 8/2017 | Lee ........................ H04W 52/02 |
| 2017/0303076 A1* | 10/2017 | Song ...................... H04W 4/80 |
| 2017/0318529 A1* | 11/2017 | Wiser ..................... H03F 3/217 |
| 2019/0364492 A1* | 11/2019 | Azizi ................. H04W 52/0261 |
| 2020/0221542 A1* | 7/2020 | Bitran .................... H04L 67/34 |
| 2022/0182453 A1* | 6/2022 | Jung .................... H04L 67/566 |
| 2022/0264282 A1* | 8/2022 | Jung ..................... H04W 8/005 |
| 2024/0073783 A1* | 2/2024 | Alpert ................... H04W 40/32 |

* cited by examiner

*Primary Examiner* — David Bilodeau
(74) *Attorney, Agent, or Firm* — Mandy Barsilai Fernandez; Frank D. Cimino (57) ABSTRACT

In an example, a method includes communicating between a first BLUETOOTH device and a second BLUETOOTH device via a first channel within a channel set at a first connection event using first channel specific parameters. The method also includes determining, by the first BLUETOOTH device, one or more channel cluster operation parameters for a second channel within the channel set at a second connection event using second channel specific parameters. The method includes communicating over the second channel during the second connection event from the first BLUETOOTH device to the second BLUETOOTH device using renegotiated second channel specific parameters.

20 Claims, 7 Drawing Sheets

BLE CHANNEL AWARE OPERATION PARAMETERS

BACKGROUND

BLUETOOTH low energy (BLE) is a wireless communication technology useful for various applications and devices, such as in healthcare, fitness, security, home entertainment, and communication devices. The BLE communication technology provides for lower power consumption of the communication devices in comparison to BLUETOOTH or other wireless communication technologies, while also maintaining a similar wireless communication range and coverage. The reduced power consumption of the communication devices may be provided by a simpler modulation scheme in comparison to the other wireless communication technologies. The BLE communication technology is based on a BLE communication standard supported by various operating systems (OS), including ANDROID, IOS, WINDOWS, MACOS, LINUX, and other OS to operate the communication devices.

SUMMARY

In accordance with at least one example of the description, a method includes communicating between a first BLUETOOTH device and a second BLUETOOTH device via a first channel within a channel set at a first connection event using first channel specific parameters. The method also includes determining, by the first BLUETOOTH device, one or more channel cluster operation parameters for a second channel within the channel set at a second connection event using second channel specific parameters. The method includes communicating over the second channel during the second connection event from the first BLUETOOTH device to the second BLUETOOTH device using renegotiated second channel specific parameters.

In accordance with at least one example of the description, a method includes transmitting an advertisement of one or more channel cluster operation parameters for a channel within a channel set from a first BLUETOOTH device. The method also includes receiving, at a second BLUETOOTH device, the advertisement. The method includes, responsive to receiving the advertisement at the second BLUETOOTH device, deciding to accept the one or more channel cluster operation parameters for the channel within the channel set. The method also includes, responsive to accepting the one or more channel cluster operation parameters for the channel within the channel set, transmitting an acceptance from the second BLUETOOTH device to the first BLUETOOTH device during a connection event using the advertisement of the one or more channel cluster operation parameters.

In accordance with at least one example of the description, a method includes transmitting an advertisement of one or more channel cluster operation parameters for a channel within a channel set from a proxy BLUETOOTH device. The method also includes receiving the advertisement at a first BLUETOOTH device. The method includes, responsive to receiving the advertisement at the first BLUETOOTH device, transmitting a request to set a channel cluster operation parameter for the channel within the channel set from the first BLUETOOTH device to a second BLUETOOTH device, where the request includes at least one of the one or more channel cluster operation parameters. The method also includes, receiving, at the first BLUETOOTH device, a response to the request from the second BLUETOOTH device.

BRIEF DESCRIPTION OF THE DRAWINGS

The same reference numbers or other reference designators are used in the drawings to designate the same or similar (functionally and/or structurally) features.

DETAILED DESCRIPTION

The BLUETOOTH (BT) Low Energy (BLE) standard defines a standard hierarchy of components. The hierarchy includes a BLE controller and a BLE host. Some examples may include a BLE PHY (physical) layer and a radio frequency (RF) frontend. On top of the BLE controller and BLE host resides the BLE application. The BLE controller handles all tasks required for a connection to stay active. A BLE connection consists of two devices. BLE devices communicate at constant intervals (i.e. connection events) on channels known as a BLE data channel set. During a connection event, a device called a central establishes a connection event by transmitting a packet to a device called a peripheral. According to the BLE communication standard in the Bluetooth Core Specification Verification 5.3, which is incorporated herein by reference, data transfers may be carried over links or data channels, which are connections established between communication devices to exchange data in the form of messages or packets. Each data channel has a unique band between 2.4 gigahertz (GHz) and 2.4835 GHz and thus each of those channels has unique characteristics.

The data channels used for BLE communication may experience channel fading. For example, over distance or time, the received signal from a transmitter to a receiver may become attenuated. Interference may also occur over some channels. Each channel may have unique characteristics with respect to fading. To counter the effects of fading over time, the BLE protocol uses a channel hopping scheme. A single channel is used initially, and then the channel is modified based on the negotiated channel hopping scheme for subsequent exchanges of data, known as a channel-set, where every connection event occurs at a pre-defined channel within the channel-set. A connection parameter may be modified during a connection event. These parameters may include transmit power, maximum packet size and length, connection interval duration limitations, rate limit, or other parameters. Each of these parameters has an influence on the performance of the BLE connection using this channel, such as power consumption, average and peak throughput, responsiveness, and robustness.

The BLE Protocol allows a BLE Host/Controller to control various common connection parameters, for all incoming connection events commonly. The change in parameters is based on an exchange of control messages between devices. After the message exchange is completed successfully, the new parameters are applied. Each channel has different characteristics due to selective fading and interference level. If a specific channel is corrupted, the communication is suspended for at least one connection interval, which could be 7.5 milliseconds to 4 seconds. The communication between devices can resume only at the next connection interval. This delay impacts the device's power, robustness, throughput, and responsiveness. Also, because each channel has different channel characteristics, using common parameters value for all channels is not efficient.

In examples herein, systems and methods are described for negotiating, setting, and modifying pre-defined, bi-directional (central and peripheral) channel aware (per channel for incoming and ongoing channels) operation parameters between central and peripheral devices. Parameters may be set per incoming channel in one example. In another example, a long-term channel operation point may be set without the need for renegotiation. The characteristics of the channels may be optimized per channel or per operation channel within the channel set. In some examples, per channel operation points may be tuned dynamically, during the operation for incoming and ongoing channels. The channel aware operation parameters setting methodology described herein may include the parameters that enable a BLE device to combat channel interference and/or fading, and may include channel aware transmit power limitation configuration, maximum packet size and length (e.g., transmission duration) per channel, channel aware connection interval duration limitation configuration, and per-channel rate limitations. In some examples, a negotiation procedure may be performed where a BLE device in a connection with another device may request to negotiate a set of parameters for a specific set of channels. The request may be based on the requesting device's characterization of the environment around it. The responding device may deny, alter or accept the request in some examples.

The examples described herein may also include an advertising procedure, where a BLE device may share a set of channel specific parameters within the channel set via standard advertising procedures. Other devices may choose to accept these channel specific parameters before entering a connection with the BLE device. In another example, an indirect negotiation procedure may be performed, where a proxy device holds information about channel interference and/or fading within the channel set that may be used to distribute channel specific parameters of the channels within the channel set to multiple devices. Other devices in the proxy device's vicinity may choose to adopt these channel specific parameters for a single channel or for a group or subset of channels within the channel set.

Figure 1:
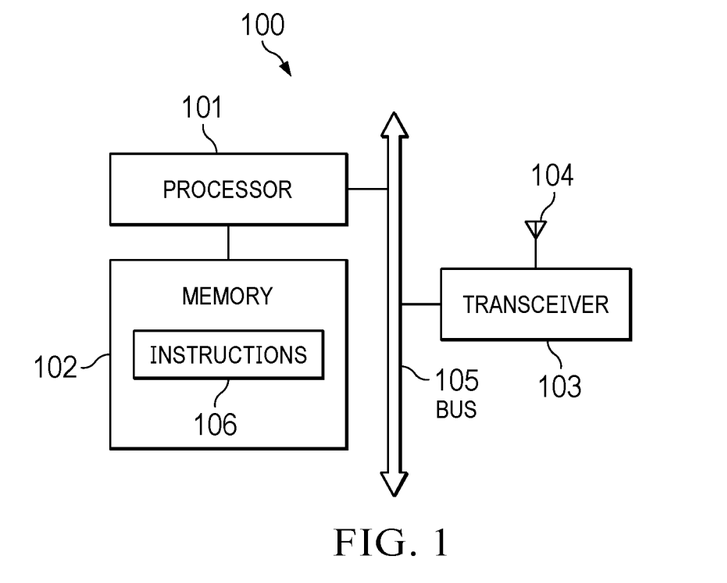
FIG. 1 is a block diagram of a processing and communication system in accordance with various examples.

FIG. 1 is a block diagram of a processing and communication system 100 useful for processing and exchanging data, in accordance with various examples herein. The processing and communication system 100 may be a BLE device that is capable of establishing a connection to transmit and receive messages or packets in accordance with a BLE communication standard. For example, the processing and communication system 100 may be a central device, such as a router or a BLE hub, a computer device or a smartphone, or may be a peripheral device such as an Internet of Things (IoT) device, a sensor or other BLE device capable of establishing a connection with a second BLE device or a network, such as the Internet. In some examples, the processing and communication system 100 may be a system on a chip (SoC), an electronic circuit board or a computer card of a BLE device.

The processing and communication system 100 includes hardware components for establishing a connection and transmitting and receiving data in accordance with the BLE communication standard. As shown in FIG. 1, the processing and communication system 100 may include one or more processors 101 and one or more memories 102. The processing and communication system 100 may also include one or more transceivers 103 and one or more antennas 104 for establishing wireless connections. These components may be coupled through a bus 105, or in any other suitable manner. In FIG. 1, an example in which the components are coupled through a bus 105 is shown.

The processor 101 is configured to read and execute computer-readable instructions. For example, the processor 101 is configured to invoke and execute instructions in a program stored in the memory 102, including instructions 106. Responsive to the processor 101 transmitting data, the processor 101 drives or controls the transceiver 103 to perform the transmitting. The processor 101 also drives or controls the transceiver 103 to perform receiving, responsive to the processor 101 receiving data. Therefore, the processor 101 may be considered as a control center for performing the transmitting or receiving of data and the transceiver 103 is an executor for performing the transmitting and receiving operations.

In some examples, the memory 102 is coupled to the processor 101 through the bus 105. In other examples, the memory 102 is integrated with the processor 101. The memory 102 is configured to store various software programs and/or multiple groups of instructions, including the instructions 106. The memory 102 may include one or more storage devices. For example, the memory 102 includes a high-speed random-access memory and/or may include a nonvolatile memory such as one or more disk storage devices, a flash memory, another nonvolatile solid-state storage device, or a pseudo-static random-access memory (PSRAM). The memory 102 may store an OS such as ANDROID, IOS, WINDOWS or LINUX. The memory 102 may further store a network communications program. The network communications program is useful for performing communications with one or more attached devices, one or more user devices, or one or more network devices. The memory 102 may further store a user interface program. The user interface program displays content of an application through a graphical interface and receives data or an operation performed by a user on the application via an input control such as a menu, a dialog box or a physical input device (not shown). The memory 102 is configured to store the instructions 106 for implementing the various methods and processes provided in accordance with the various examples of this description.

The transceiver 103 includes a transmitter and a receiver. The transceiver 103 is configured to transmit one or more signals that is provided by the processor 101. The transceiver 103 is also configured to receive one or more signals from other devices or equipment. In this example, the transceiver 103 may be considered a wireless transceiver. The antenna 104 may be configured to enable the exchanging of wireless communication signals between the transceiver 103 and a network or another system or device.

The processing and communication system 100 may also include another communication component such as a Global Positioning System (GPS) module, cellular module, a BLUETOOTH or BLE module, Zigbee module, Long Term Evolution (LTE), LTE-Machine Type Communication (LTE-M), Narrow Band LTE (NB-LTE), Sub-Gigahertz Communication (sub1G), or a Wireless Fidelity (WI-FI) module. The processing and communication system 100 may also support another wireless communication signal such as a satellite signal or a short-wave signal. The processing and communication system 100 may also be provided with a wired network interface or a local area network (LAN) interface to support wired communication.

In various examples, the processing and communication system 100 may further include an input/output interface (not shown) for enabling communications between the processing and communication system 100 and one or more input/output devices (not shown). Examples of the input/output devices include an audio input/output device, a key input device, a display and the like. The input/output devices are configured to implement interaction between the processing and communication system 100 and a user or an external environment. The input/output device may further include a camera, a touchscreen, a sensor, and the like. The input/output device communicates with the processor 101 through a user interface.

The processing and communication system 100 shown in FIG. 1 is an example of a processing and communication system or device. During actual application, the processing and communication system 100 may include more or fewer components. The processing and communication system 100 may be part of a BLE device that is connected to other BLE devices.

Figure 2:
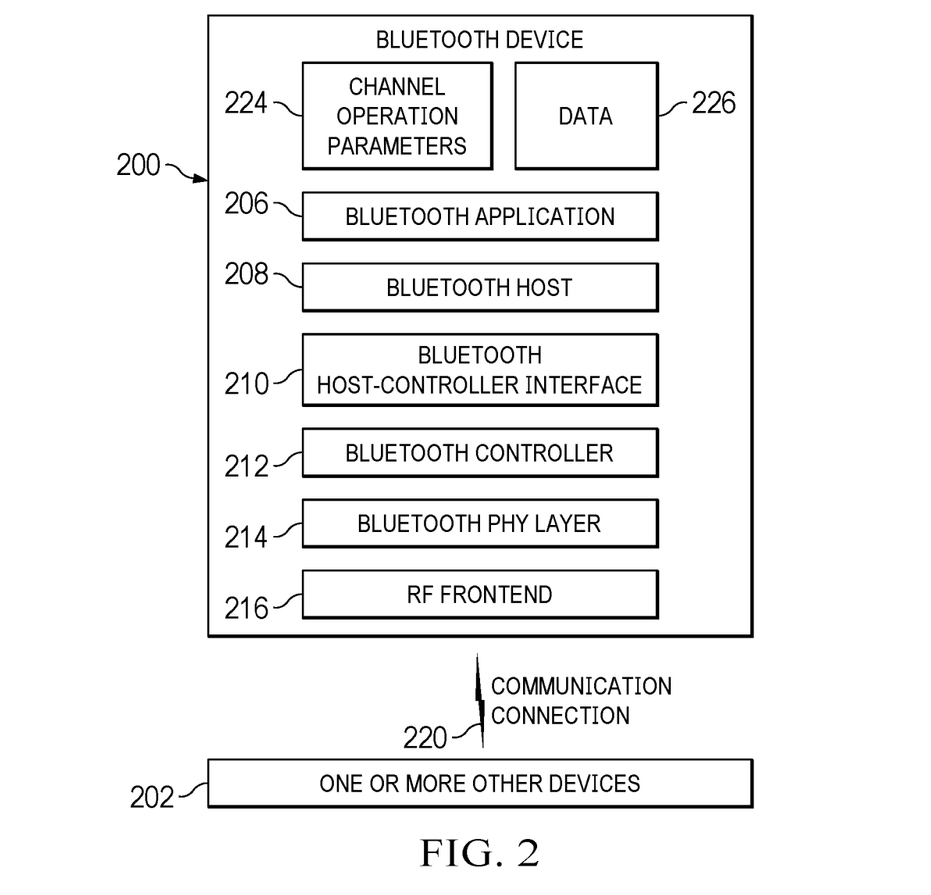
FIG. 2 is a BLUETOOTH device (e.g., a BLE device) communicatively coupled to one or more other devices in accordance with various examples.

FIG. 2 depicts an example of a BLUETOOTH device 200 (e.g., a BLE device) communicatively coupled to one or more other devices 202 via communication connection 220 in accordance with various examples herein. Communication connection 220 could be a channel as described herein. The one or more other devices 202 include any device configured to communicate with the BLUETOOTH device 200. The communication connection 220 may be any connection medium, link, channel, or connection, such as a wireless communication connection.

The BLUETOOTH device 200 includes a BLUETOOTH application 206, a BLUETOOTH host 208, a BLUETOOTH host-controller interface 210, a BLUETOOTH controller 212, a BLUETOOTH PHY layer 214, and an RF frontend 216.

In some examples, the BLUETOOTH device 200 of FIG. 2 corresponds to, includes the components of, and is configured as described above with reference to communication system 100 of FIG. 1. Thus, references herein to the BLUETOOTH device 200 of FIG. 2 may be considered as references to the communication system 100 of FIG. 1. In some examples, the one or more other devices 202 may correspond to, include the components of, and be configured as described above with reference to communication system 100 of FIG. 1. In some examples, the one or more other devices 202 may include similar components as BLUETOOTH device 200.

The BLUETOOTH device 200 is configured to provide the BLUETOOTH controller 212 channel cluster operation parameters 224. The BLUETOOTH device 200 is configured to provide the channel cluster operation parameters 224 to the one or more other devices 202, in order to negotiate a communication channel between the devices as described herein. Data 226 may include any data related to communication between devices, such as performance indicators related to a channel (e.g., power consumption, average and peak throughput, responsiveness, etc.).

BLUETOOTH device 200 may communication with device 202 using an operation channel. A channel cluster may be a collection of channels that includes the operation channel and other channels used by other devices that impact the operation channel. As an example, BLUETOOTH device 200 may monitor communication channels used to communicate with one or more other devices 202 to determine the average throughput of each of the specific device operation channels within a channel set. The channel cluster may make up the channels in the channel set in some examples. In other examples, the channel set may include other channels as well. Therefore, the channel cluster may be a subset of channels within the channel set in some examples. In other examples, the channel cluster may include the channel set and other channels. BLUETOOTH device 200 may also monitor other channels within the channel cluster or channel set that impact the channels currently used for communication. Based on the monitoring, BLUETOOTH device 200 may determine that communication between devices on an existing channel has experienced degradation (e.g., due to interference or fading), and then renegotiate to modify, add, or remove specific operation channels within the channel set, or perform channel set reordering to increase average throughput to an acceptable level. BLUETOOTH device 200 may renegotiate new channel cluster operation parameters within the channel set for improved communication, such as transmit power, maximum packet size and length, or connection interval duration limitations. Channel cluster operation parameters may also include replacing or suspending a channel within the channel set. BLUETOOTH device 200 may then request to negotiate channel cluster operation parameters for a specific set of channels within the channel set with a device 202. Device 202 may deny, alter, or accept the request. If the request is accepted, BLUETOOTH device 200 and device 202 communicate using the new channel cluster operation parameters for a channel within the channel set. If device 202 alters the request, BLUETOOTH device 200 may accept the altered request, deny the altered request, or provide another request. If device 202 denies the request, BLUETOOTH device 200 may send a new request in some examples. Also, BLUETOOTH device 200 and other devices 202 may negotiate operation parameters for a single channel or for multiple channels within the channel set.

In some examples, BLUETOOTH device 200 may use advertising procedures to share a set of per-channel unique operation parameters within the channel set. Other devices 202 (such as a second BLUETOOTH device 202 and/or a third BLUETOOTH device 202) may receive these advertised per-channel operation parameters for channels within the channel set and negotiate a communication connection with BLUETOOTH device 200. Other devices 202 may accept the advertised channel cluster operation parameters for channels within the channel set, or may alter the channel cluster operation parameters and then negotiate a communication connection with BLUETOOTH device 200. By using advertising procedures, communication connections may be made faster or with lower power use than other procedures.

Figure 3:
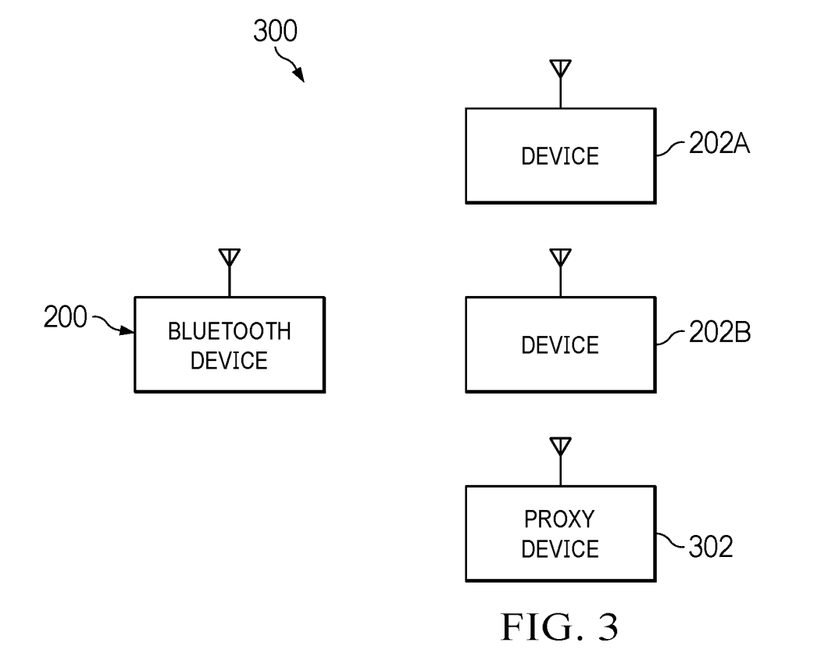
FIG. 3 is a system for negotiating channel cluster operation parameters using a proxy in accordance with various examples.

FIG. 3 is a system 300 for negotiating channel cluster operation parameters for channels within the channel set using a proxy in accordance with various examples herein. System 300 includes a BLUETOOTH device 200, a device 202A, a device 202B, and a proxy device 302. Devices 202A and 202B may be other devices 202 as described above. Proxy device 302 may be a device such as BLUETOOTH device 200, other device 202, or communication system 100. BLUETOOTH device 200, device 202A, device 202B, and proxy device 302 may communicate with one another via BLUETOOTH, LTE, WI-FI, cellular, or any other wireless or wired communication technology. In other examples, any number of devices such as BLUETOOTH device 200, device 202A, device 202B, and proxy device 302 may be present in system 300.

In one example, BLUETOOTH device 200 is a central device, while devices 202A and 202B are peripheral devices. In system 300, negotiation of channel cluster operation parameters may be performed via indirect negotiation with proxy device 302. In this example, proxy device 302 may hold information regarding channel interference or fading. Proxy device 302 may also hold information regarding channel cluster operation parameters for system 300. This information may be held in a memory in proxy device 302 (not shown in FIG. 3). Proxy device 302 may collect the above information itself or receive the above information from another device.

Proxy device 302 may distribute information regarding channel cluster operation parameters for channels within the channel set to other devices in system 300, including BLUETOOTH device 200, device 202A, or device 202B. Proxy device 302 may distribute this information to the other devices using any suitable wired connection or wireless connection, such as BLE, WI-FI, LAN, cellular, etc. Proxy device 302 may broadcast the information in one example. In another example, devices in system 300 may query proxy device 302 for the information.

Devices in system 300 may use the information from proxy device 302 to negotiate or adopt channel specific parameters for a single channel or a group (subset) of channels within the channel set to communicate with other devices in system 300. As one example, proxy device 302 may store channel cluster operation parameters (e.g., information) for one or more channels within the channel set. Devices in system 300 that experience channel fading or interference on a first channel may request channel cluster operation parameters for a second channel within the channel set from proxy device 302. Responsive to the request, proxy device 302 provides the channel cluster operation parameters for the second channel to the device, such as to BLUETOOTH device 200. BLUETOOTH device 200 may then attempt to negotiate a communication connection with another device in system 300 for communicating over the second (alternate) channel within the channel set. The other device in system 300 may deny, alter, or accept the request from BLUETOOTH device 200. If the request is accepted, BLUETOOTH device 200 may communicate with proxy device 302 that the second channel is in use, and may also communicate the current channel cluster operation parameters being used for the second channel to proxy device 302. Proxy device 302 may store this information and use it for future requests. In examples herein, any device in system 300 may request or receive channel operation information for channels within the channel set from proxy device 302, and use that information to negotiate or establish a connection at a channel within the channel set with per-channel operating parameters with any other device in system 300.

Figure 4:
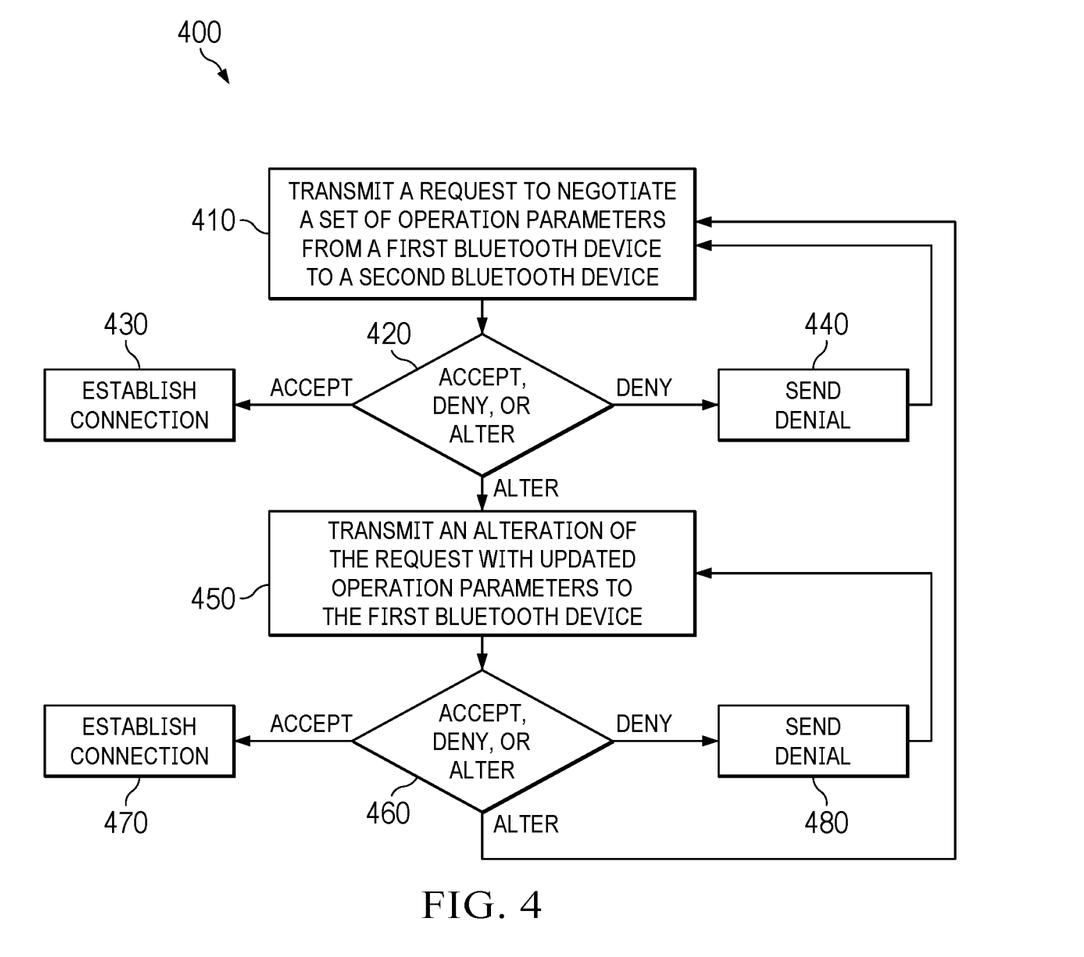
FIG. 4 is flow diagram of a method for negotiating BLE operation parameters in accordance with various examples.

FIG. 4 is a flow diagram of a method 400 for negotiating BLE operation parameters per channel within the channel set in accordance with various examples herein. The steps of method 400 may be performed in any suitable order. The hardware components described above with respect to FIGS. 1-3 may perform method 400 in some examples. Any suitable hardware or digital logic may perform method 400 in some examples.

Method 400 begins at 410, where a first BLUETOOTH device transmits a request to negotiate a set of operation parameters per channel within the channel set to a second BLUETOOTH device. The per channel operation parameters may be the parameters described above, such as transmit power, maximum packet size and length, connection interval duration limitations, rate limit, or other parameters.

Method 400 continues at 420, where the second BLUETOOTH device decides to accept, deny, or alter the request. The second BLUETOOTH device may use any suitable criteria for making the decision. For example, the second BLUETOOTH device may have different estimates of the fading and interference levels of the one or more channels within the channel set, which may affect the decision that the second BLUETOOTH device makes at 420.

If the second BLUETOOTH device accepts the request, the method moves to 430, where the second BLUETOOTH device establishes a connection with the first BLUETOOTH device. The second BLUETOOTH device may send a confirmation message to the first BLUETOOTH device or continue a negotiation to establish the connection and use the operation parameters per channel within the channel set during a specific connection event.

If the second BLUETOOTH device denies the request, the method moves to 440. The second BLUETOOTH device sends a message to the first BLUETOOTH device that the request is denied. In one example, the method proceeds back to 410, where the first BLUETOOTH device may transmit another request to negotiate a set of operation parameters per channel within the channel set, and the process begins again.

If the second BLUETOOTH device alters the request, the method moves to 450. The second BLUETOOTH device may alter the request based on its own assessment of the operation parameters per channel within the channel set. At 450, the second BLUETOOTH device transmits an alteration of the request with updated operation parameters per channel within the channel set to the first BLUETOOTH device.

Method 400 continues at 460, where the first BLUETOOTH device decides to accept, deny, or alter the request. The first BLUETOOTH device may use any suitable criteria for making the decision.

If the first BLUETOOTH device accepts the request, the method moves to 470, where the first BLUETOOTH device establishes a connection with the second BLUETOOTH device. The first BLUETOOTH device may send a confirmation message to the second BLUETOOTH device or continue a negotiation to establish the connection.

If the first BLUETOOTH device denies the request, the method moves to 480. The first BLUETOOTH device sends a message to the second BLUETOOTH device that the request is denied. In one example, the method proceeds back to 450, where the second BLUETOOTH device may transmit another request to negotiate a set of operation parameters, and the process begins again.

If the first BLUETOOTH device alters the request, the method moves back to 410. The first BLUETOOTH device may alter the request based on its own assessment of the operation parameters per channel within the channel set. At 410, the first BLUETOOTH device transmits an alteration of the request with updated operation parameters per channel within the channel set to the second BLUETOOTH device, and the process may begin again.

Figure 5:
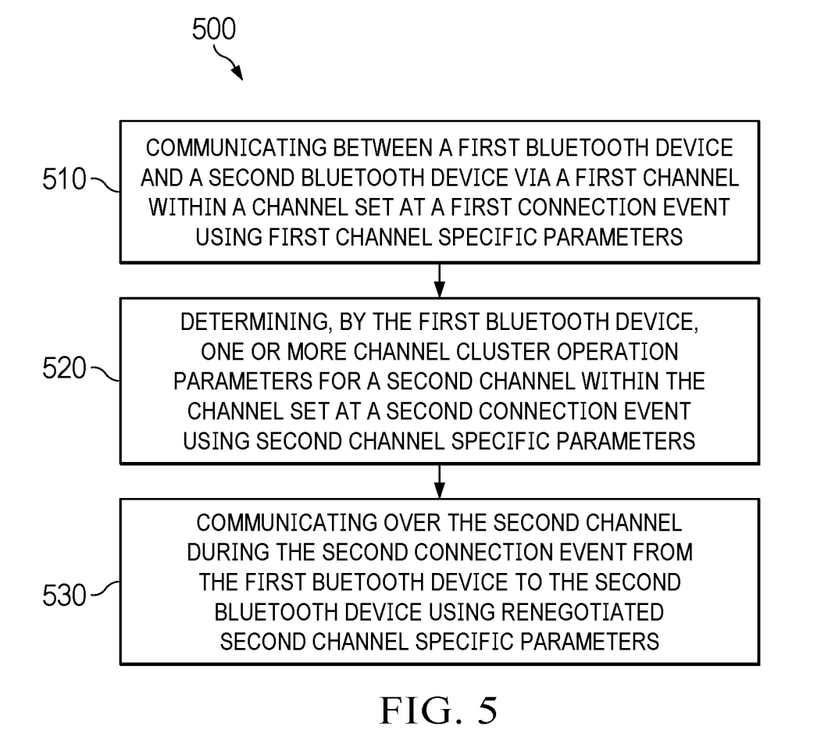
FIG. 5 is flow diagram of a method for negotiating BLE operation parameters in accordance with various examples.

FIG. 5 is a flow diagram of a method 500 for negotiating BLE operation parameters per channel within the channel set in accordance with various examples herein. The steps of method 500 may be performed in any suitable order. The hardware components described above with respect to FIGS. 1-3 may perform method 500 in some examples. Any suitable hardware or digital logic may perform method 500 in some examples.

Method 500 begins at 510, where a first BLUETOOTH device and a second BLUETOOTH device communicate via a first channel within a channel set at a first connection event using first channel specific parameters. The first channel may have a set of channel cluster operation parameters per channel within the channel set. In one example, if the first channel experiences degradation, the first BLUETOOTH device or the second BLUETOOTH device may attempt to switch to another channel within the channel set after renegotiation of the new channel set.

Method 500 continues at 520, where the first BLUETOOTH device determines one or more channel cluster operation parameters for a second channel within the channel set at a second connection event using second channel specific parameters. The first BLUETOOTH device may determine the relevant channel cluster operation parameters within the channel set that enable a BLUETOOTH device to combat channel interference and/or fading. These channel cluster operation parameters may include channel aware transmit power, maximum packet size and length (e.g., transmission duration) per channel, channel aware connection interval duration limitations configuration, and/or per channel rate limitation. Other channel cluster operation parameters may be determined in other examples. The first BLUETOOTH device may determine these parameters for one or more channels within the channel set.

Method 500 continues at 530, where the first BLUETOOTH device communicates over the second channel during the second connection event to the second BLUETOOTH device using renegotiated second channel specific parameters. As described herein, in some examples there is an optional step where the first BLUETOOTH device may send a request to the second BLUETOOTH device and receive a response to the request before communicating over the second channel.

Figure 6:
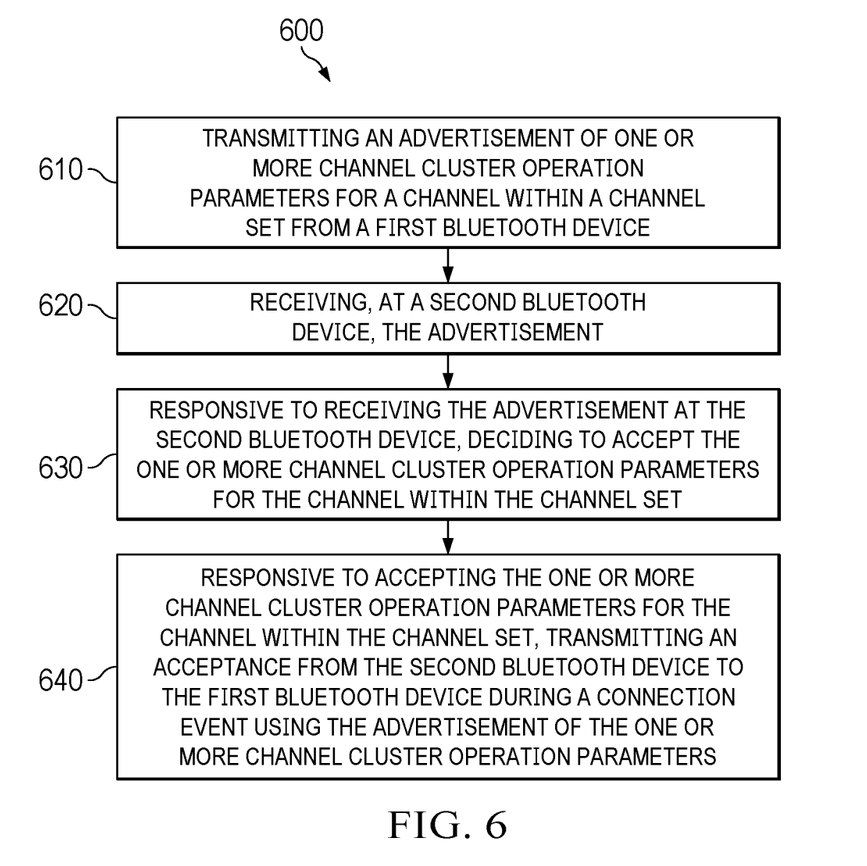
FIG. 6 is flow diagram of a method for advertising BLE operation parameters in accordance with various examples.

FIG. 6 is a flow diagram of a method 600 for advertising BLE operation parameters per channel within the channel set in accordance with various examples herein. The steps of method 600 may be performed in any suitable order. The hardware components described above with respect to FIGS. 1-3 may perform method 600 in some examples. Any suitable hardware or digital logic may perform method 600 in some examples.

Method 600 begins at 610, where a first BLUETOOTH device transmits an advertisement of one or more channel cluster operation parameters for a channel within a channel set. The advertisement may be transmitted to any number of other BLUETOOTH devices. The advertisement may use any suitable BLUETOOTH advertisement procedures.

Method 600 continues at 620, where a second BLUETOOTH device receives the advertisement. The second BLUETOOTH device may listen for advertisements from any number of other BLUETOOTH devices in some examples.

Method 600 continues at 630, where the second BLUETOOTH device decides to accept the one or more channel cluster operation parameters per channel within the channel set responsive to receiving the advertisement. In other examples, as described above, the second BLUETOOTH device may deny or alter the request.

Method 600 continues at 640, where the second BLUETOOTH device transmits an acceptance from the second BLUETOOTH device to the first BLUETOOTH device responsive to accepting the one or more channel cluster operation parameters per channel within the channel set during a connection event using the advertised channel cluster operation parameters. After the acceptance is received at the first BLUETOOTH device, further negotiation may occur if needed, or a link may be established between the two devices.

Figure 7:
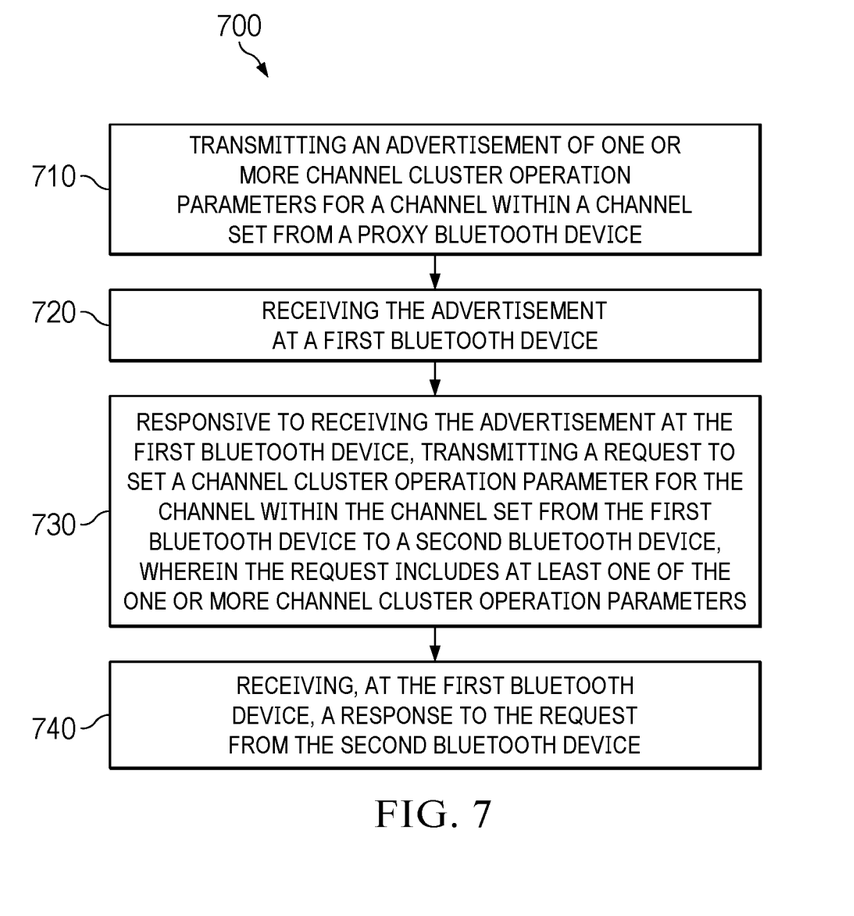
FIG. 7 is flow diagram of a method for indirectly negotiating channel specific operation parameters in accordance with various examples.

FIG. 7 is a flow diagram of a method 700 for indirectly negotiating channel specific operation parameters per channel within the channel set in accordance with various examples herein. The steps of method 700 may be performed in any suitable order. The hardware components described above with respect to FIGS. 1-3 may perform method 700 in some examples. Any suitable hardware or digital logic may perform method 700 in some examples.

Method 700 begins at 710, where a proxy BLUETOOTH device transmits an advertisement of one or more channel cluster operation parameters. The proxy device may be a device such as proxy device 302 described above with respect to FIG. 3. The proxy BLUETOOTH device may transmit channel cluster operation parameters for any number of channels.

Method 700 continues at 720, where a first BLUETOOTH device receives the advertisement. Method 700 then continues at 730, where, responsive to receiving the advertisement at the first BLUETOOTH device, the first BLUETOOTH device transmits a request to set a channel cluster operation parameter for the channel within the channel set from the first BLUETOOTH device to a second BLUETOOTH device. The request includes at least one of the one or more channel cluster operation parameters per channel within the channel set.

Method 700 continues at 740, where the first BLUETOOTH device receives a response to the request from the second BLUETOOTH device. In some examples, the response may be an acceptance, a denial, or an alteration of the request. If the request is accepted or altered, a communication link may be established between the two devices.

In examples herein, systems and methods are described for negotiating, setting, and modifying pre-defined, bi-directional (central and peripheral) channel aware (per channel within the channel set for incoming and ongoing channels) operation parameters between central and peripheral devices. Parameters may be set per incoming channel in one example. In another example, a long-term channel operation point may be set without the need for renegotiation. The characteristics of the channels may be optimized per channel or per subset of the channel set. In some examples, per channel operation points within the channel set may be tuned dynamically, during the operation for incoming and ongoing channels. In some examples, a negotiation procedure may be performed where a BLE device in a connection with another device may request to negotiate a set of parameters for a specific set of channels within the channel set. The request may be based on the requesting device's characterization of the environment around it. The responding device may deny, alter or accept the request in some examples.

The examples described herein may also include an advertising procedure, where a BLE device may share a set of channel specific parameters for channels within the channel set via standard advertising procedures. Other devices may choose to accept these channel specific parameters before entering a connection with the BLE device. In another example, an indirect negotiation procedure may be performed, where a proxy device holds information about channel interference and/or fading within the channel set that may be used to distribute channel specific parameters for channels within the channel set to multiple devices. Other devices in the proxy device's vicinity may choose to adopt these channel specific parameters for a single channel or for a group or subset of channels within the channel set.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. A method, comprising:
    communicating between a first BLUETOOTH device and a second BLUETOOTH device via a first channel within a channel set at a first connection event using first channel specific parameters;
    determining, by the first BLUETOOTH device, one or more channel cluster operation parameters for a second channel within the channel set at a second connection event using second channel specific parameters; and
    communicating over the second channel during the second connection event from the first BLUETOOTH device to the second BLUETOOTH device using renegotiated second channel specific parameters.

2. The method of claim 1, wherein the first BLUETOOTH device receives a response to a request to communicate over the second channel, and the response is an acceptance of the request.

3. The method of claim 1, wherein the first BLUETOOTH device receives a response to a request to communicate over the second channel, and the response includes an alteration of the request.

4. The method of claim 3, wherein the alteration of the request includes one or more updated channel cluster operation parameters for the second channel within the channel set.

5. The method of claim 1, wherein one of the one or more channel cluster operation parameters for the second channel within the channel set is a transmit power limitation of the second channel.

6. The method of claim 1, wherein one of the one or more channel cluster operation parameters for the second channel within the channel set is a maximum packet size.

7. The method of claim 1, wherein one of the one or more channel cluster operation parameters for the second channel within the channel set is a connection interval duration limitation.

8. The method of claim 1, wherein one of the one or more channel cluster operation parameters includes replacing a channel within the channel set.

9. The method of claim 1, wherein one of the one or more channel cluster operation parameters includes suspending a channel within the channel set.

10. A method, comprising:
    transmitting an advertisement of one or more channel cluster operation parameters for a channel within a channel set from a first BLUETOOTH device;
    receiving, at a second BLUETOOTH device, the advertisement;
    responsive to receiving the advertisement at the second BLUETOOTH device, deciding to accept the one or more channel cluster operation parameters for the channel within the channel set; and
    responsive to accepting the one or more channel cluster operation parameters for the channel within the channel set, transmitting an acceptance from the second BLUETOOTH device to the first BLUETOOTH device during a connection event using the advertisement of the one or more channel cluster operation parameters.

11. The method of claim 10, wherein a third BLUETOOTH device receives the advertisement and transmits an acceptance from the third BLUETOOTH device to the first BLUETOOTH device.

12. The method of claim 10, wherein one of the one or more channel cluster operation parameters for the channel within the channel set is a transmit power limitation.

13. The method of claim 10, wherein one of the one or more channel cluster operation parameters for the channel within the channel set is a maximum packet size.

14. The method of claim 10, wherein the one or more channel cluster operation parameters apply to a group of channels within the channel set.

15. A method, comprising:
    transmitting an advertisement of one or more channel cluster operation parameters for a channel within a channel set from a proxy BLUETOOTH device;
    receiving the advertisement at a first BLUETOOTH device;
    responsive to receiving the advertisement at the first BLUETOOTH device, transmitting a request to set a channel cluster operation parameter for the channel within the channel set from the first BLUETOOTH device to a second BLUETOOTH device, wherein the request includes at least one of the one or more channel cluster operation parameters; and
    receiving, at the first BLUETOOTH device, a response to the request from the second BLUETOOTH device.

16. The method of claim 15, wherein the one or more channel cluster operation parameters apply to a group of channels.

17. The method of claim 15, wherein transmitting the advertisement includes transmitting the advertisement over a wireless fidelity (WI-FI) connection.

18. The method of claim 15, wherein transmitting the advertisement includes transmitting the advertisement over a wired connection.

19. The method of claim 15, wherein the response is an acceptance of the request.

20. The method of claim 15, wherein the response includes an alteration of the request.

* * * * *